United States Patent [19]

Pièrart

[11] Patent Number: 4,511,532

[45] Date of Patent: Apr. 16, 1985

[54] DEVICE FOR SUPPORTING AND PROTECTING NUCLEAR BOILERS

[75] Inventor: Robert Pièrart, Nantes, France

[73] Assignee: Ateliers et Chantiers de Bretagne, A C B, France

[21] Appl. No.: 48,802

[22] Filed: Jun. 15, 1979

[30] Foreign Application Priority Data

Jun. 23, 1978 [FR] France ................... 78 20405

[51] Int. Cl.³ .................... G21C 15/12; G21C 13/02
[52] U.S. Cl. ............................................... 376/461
[58] Field of Search ............... 176/37, 38, 65; 52/485, 52/488; 403/26, 204, 347; 165/157; 285/64, 330; 308/6 R, 6 B; 376/406, 461

[56] References Cited

U.S. PATENT DOCUMENTS

| | | | |
|---|---|---|---|
| 2,952,019 | 9/1960 | Goodman | 176/19 J |
| 3,045,724 | 7/1962 | Mitchell | 306/6 R |
| 3,185,631 | 5/1965 | Long | 176/65 |
| 3,190,807 | 7/1965 | Bevilaqua | 176/65 |
| 3,254,399 | 6/1966 | Zahuranec | 285/64 |
| 3,264,863 | 8/1966 | Maropis | 176/19 R |
| 3,353,875 | 11/1967 | Karge | 308/6 R |
| 3,454,466 | 7/1969 | Pitt | 176/38 |
| 3,659,909 | 5/1972 | Egbert | 306/6 R |
| 3,716,451 | 2/1973 | Van Sickel et al. | 376/461 |
| 3,771,499 | 11/1973 | Marroni, Jr. et al. | 376/461 |
| 3,916,944 | 11/1975 | Crawford et al. | 376/461 |
| 3,937,651 | 2/1976 | Schabert | 176/87 |
| 3,947,322 | 3/1976 | Dorner et al. | 376/461 |
| 3,953,289 | 4/1976 | Costes | 176/87 |
| 3,963,281 | 6/1976 | Riegler | 306/6 R |
| 3,984,282 | 10/1976 | Kleimola | 176/87 |
| 4,064,005 | 12/1977 | Baujat | 376/461 |
| 4,115,194 | 9/1978 | Botti | 376/461 |
| 4,236,970 | 12/1980 | Harand et al. | 376/461 |

FOREIGN PATENT DOCUMENTS

| | | | |
|---|---|---|---|
| 540455 | 7/1959 | Canada | 176/30 |
| 889758 | 1/1959 | United Kingdom | 176/87 |

*Primary Examiner*—Sal Cangialosi
*Attorney, Agent, or Firm*—Steinberg & Raskin

[57] ABSTRACT

This invention relates to a rigid device for supporting a reactor vessel and steam generators associated therewith. The device consists of a metallic structure comprising, on the one hand, a lower portion serving as a support for the vessel and its associated generators through the medium of square journals fitted in fixed ball-joint bearings with a corresponding square bore and on the other hand, an upper portion 6 which comprises on either side two lateral portions surrounding and holding the generators.

14 Claims, 6 Drawing Figures

DEVICE FOR SUPPORTING AND PROTECTING NUCLEAR BOILERS

The present invention relates generally to a device for supporting an assembly of permanently interconnected apparatuses and is more particularly directed to a device for rigidly supporting a nuclear reactor vessel associated with steam generators to constitute the primary circuit of a nuclear boiler.

There have already been proposed metallic structures at least partially surrounding apparatuses such as for example heat exchangers, so as to support them through the medium of bearing members affording the apparatus certain degrees of freedom in its structure.

However, in the case of a compact assembly of apparatuses to be supported, such as, in particular, low- or medium-power nuclear reactors comprising a vessel associated with steam generators through connections that are as short as possible, the problems encountered in supporting the assembly are numerous and particular.

Indeed, such assemblies must be supported and maintained in a fixed and well determined position whatever the relative deformations and expansions of the apparatuses constituting the said assembly. This means, in the present case, that the access of the vessel and the generators associated therewith by means of short connections must remain strictly fixed in the supporting structure whatever the various stresses undergone by the said structure and the apparatuses supported thereby.

Therefore, the purpose of the present invention is especially to solve the above-mentioned particular problem encountered in supporting a nuclear reactor vessel associated with steam generators by means of very short connections, using a supporting structure with means preventing the relative displacements of the vessel and the generators upon the occurrence of various impacts or accelerations in all directions, and restricting to an extremely low value the displacement of the steam generators in case of breakage of their connections with the reactor vessel.

Moreover, the supporting structure according to the invention advantageously allows the complete reactor unit with the vessel and its associated generators to be bedded without requiring the use of additional fastening and anchoring means while at the same time ensuring the necessary biological protection.

To this end, the invention is directed to a device for supporting and protecting an assembly or permanently interconnected apparatuses, such as a nuclear reactor vessel associated with steam generators to constitute the primary circuit of a nuclear boiler, and of the type comprising a metallic structure at least partially surrounding the said assembly and supporting it through the medium of bearing members, characterized in that, in order to maintain the axis of the vessel and of its associated generators strictly fixed within the said structure, the latter is composed, on the one hand, of a lower structure on which the vessel and its generators rest through the medium of protruding elements welded on the vessel and the generators and having a polygonal shape in cross-section so as to be supported in bearings with a corresponding polygonal bore provided in the said structure, and on the other hand, of a higher cover structure, the central portion of which preferably forms the walls of the vessel discharging pond and the outer portion of which forms the side walls surrounding the said generators while at the same time maintaining them within the structure.

Briefly, the lower structure rigidly supports the vessel and the steam generators while at the same time partaking in the biological protection around the vessel, whereas the upper structure caps the lower structure to constitute, on the one hand, the walls of the discharging pond, and on the other hand, the biological protection means around the steam generators.

According to another characterizing feature of the invention, the said low structure is essentially constituted by two coaxial casings surrounding the vessel and welded on a thick base, the said vessel being provided laterally with at least two aforesaid protruding elements of polygonal cross-section supported in ball-joint bearings with a corresponding polygonal bore provided in the said two casings, whereas each generator is laterally provided at its lower portion with a said protruding element of polygonal cross-section supported in a ball-joint bearing with a corresponding polygonal bore provided in a lateral extension of the said lower structure which at least partially surrounds the water boxes of the steam generators.

It can already be understood that the polygonal shape of the protruding elements and the ball-joint bearings accommodating them will always ensure a strictly defined position of the axes of the vessel and the generators within the structure whatever the expansions and stresses to which it will be subjected.

According to still another characterizing feature of the invention, each steam generator is also provided at its upper end or top with a said protruding element of polygonal section supported in a ball-joint bearing with a corresponding polygonal bore provided in the said upper structure and located on the vertical axis of the generator.

According to one example of embodiment, the said protruding elements are square in cross-section, so that those which are welded on the vessel and at the lower portion of each generator and are supported on the said lower structure are arranged in bearings having a corresponding square section, one of the diagonals of which is directed vertically and the other horizontally.

Thus, the protruding elements of the vessel and the generators rest upon the lower structure through a V-shaped bearing surface that fixes in a strictly accurate manner the plane passing through the axes of the vessel and the generators in case of longitudinal or transverse impacts.

According to another form of embodiment, the said protruding elements have a cross-section in the shape of a regular octagon supported in a ball-joint bearing with a corresponding bore.

It is quite obvious that such a form of embodiment of the protruding elements also ensure a strictly fixed retention of the vessel and its associated generators within the supporting structure.

It will also be noted that at least the protruding elements welded on the vessel are advantageously provided with an internal bore to allow in particular the passage of pipings installed along the axis of the said bore.

According to still another characterizing feature of the invention, the lower supporting structure comprises in the lower portion of each steam generator two diametrically opposite stop devices which, while affording freedom of expansion, retain each steam generator longitudinally and transversely in the case of snap rupture of the vessel-generators connection.

Furthermore, the said coaxial casings constituting the lower structure supporting the vessel and its associated genetators through the medium of the said protruding elements comprise an inner casing having the shape of a polyhedron, e.g. that of a rectangular parallelepiped, and an outer casing which also is in the shape of a polyhedron, e.g. of a right prism with an irregular octagonal base, the said casings defining between themselves and with the vessel fluid-tight volumes filled with water to ensure neutronic protection.

On the other hand, the said walls of the upper structure embracing and maintaining the steam generators form right prisms with a trapezoidal base having common walls with the discharge pond.

Other characterizing features and advantages of the invention will appear more clearly from the following detailed description with reference to the appended drawings given solely by way of example and wherein.

Figure 1:
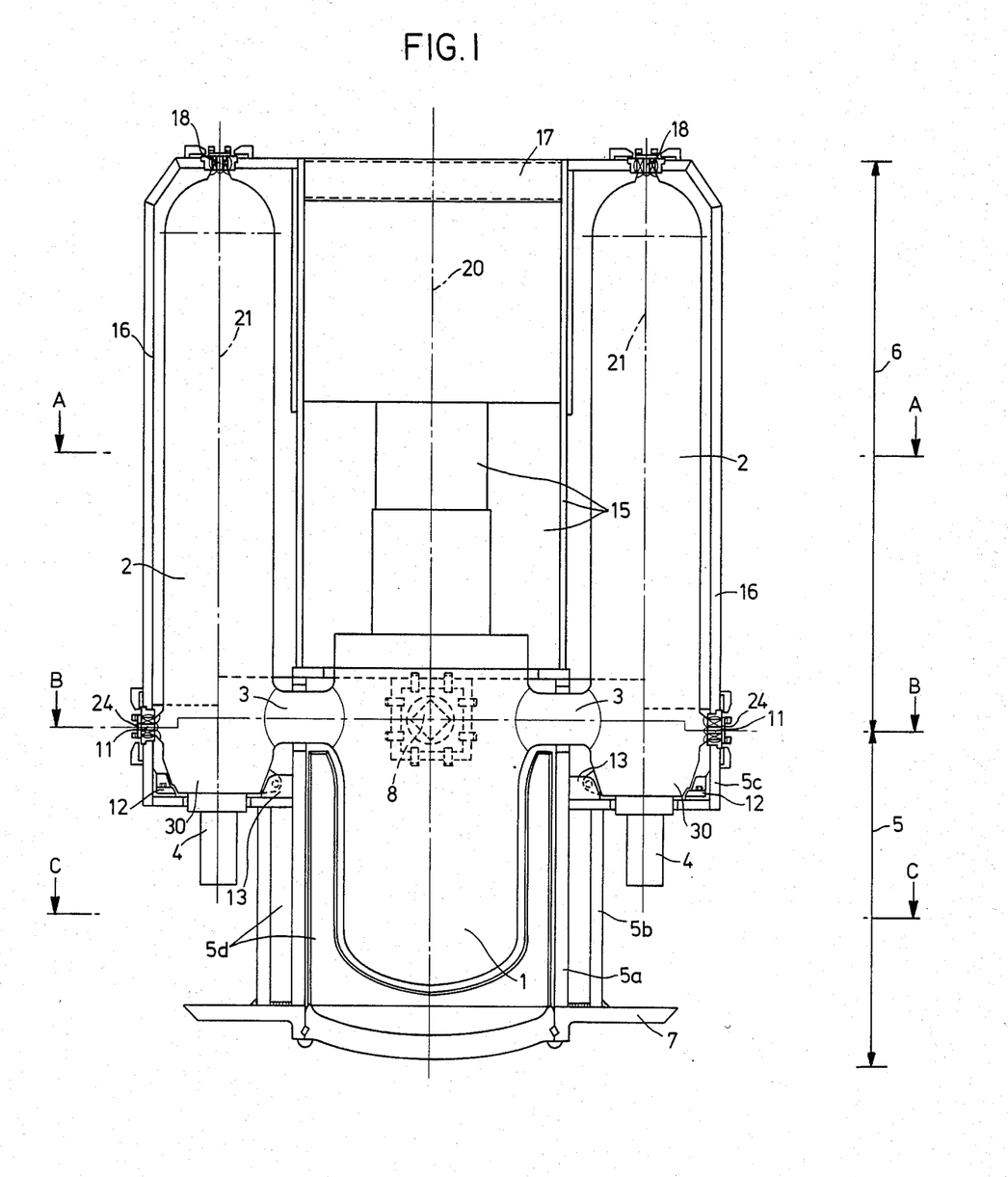
FIG. 1 is a longitudinal sectional view of the supporting structure and of the vessel and steam generators assembly.
Figure 2:
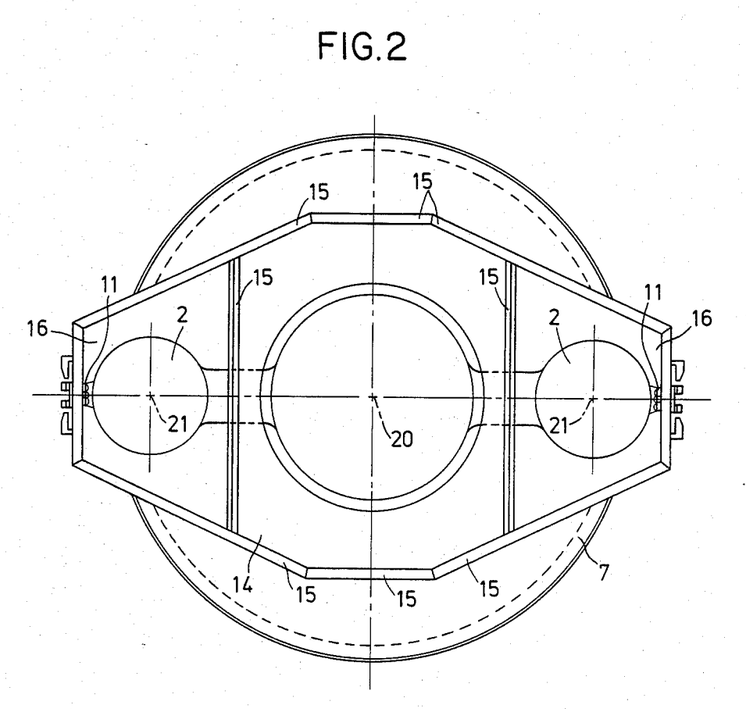
FIG. 2 is a sectional view upon the line A—A of FIG. 1.
Figure 3:
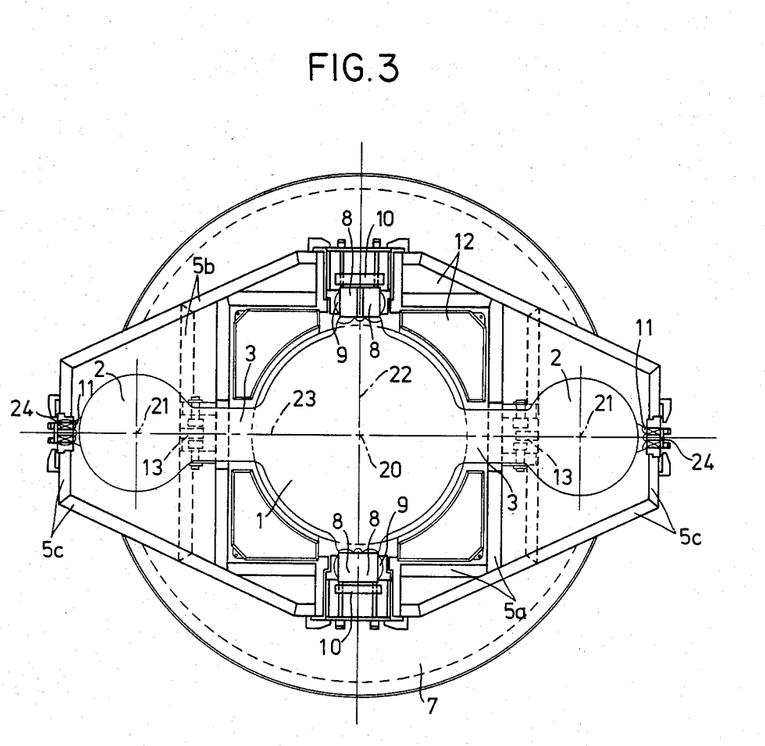
FIG. 3 is a sectional view upon the line B—B of FIG. 1.

According to one example of embodiment and as seen clearly in FIGS. 1 to 3, a device according to the invention supports a reactor vessel 1 connected to two steam generators 2 by means of very short pipes 3. At 4 are shown the primary circulating pumps secured under the water boxes 30 of the generators 2. The reference numeral 20 in FIGS. 1 to 4 denotes the axis of the vessel 1, whereas the respective axes of the generators 2 are designated by the reference numeral 21. In the example illustrated, the axes 20 and 21 of the vessel 1 and of the generators 2 are located in one and the same plane which, in the following description, will be referred to as the longitudinal plane, whereas the term transverse direction will be used to designate any direction perpendicular to this plane.

The supporting device according to the invention is composed essentially of two very rigid metallic structures, namely a lower structure 5 and an upper structure 6 rigidly connected to one another by suitable means such as seaming, lock-forming, or the like and according to a joint plane provided with baffles.

The lower structure 5 is essentially constituted by two coaxial, respectively inner and outer casings 5a and 5b, and by a lateral extension 5c surrounding the water boxes 30 of the generators 2.

The casings 5a and 5b surrounding the vessel 1 are welded at their base to a base plate 7 of very thick sheet metal, defining between themselves and with the vessel 1 fluid-tight volumes, caissons, or the like 5d filled with water to ensure the desired neutronic protection.

Figure 4:
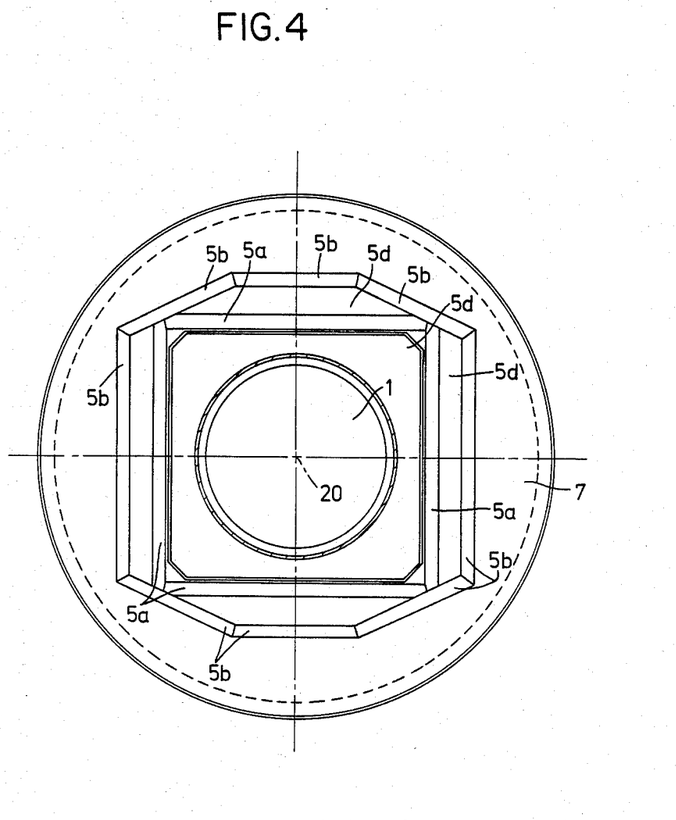
FIG. 4 is a sectional view upon the line C—C of FIG. 1.

As seen more clearly in FIG. 4 and according to a preferred form of embodiment, the coxial casings 5a and 5b are in the shape of a polyhedron. More precisely and according to one example of embodiment, the casing 5a is obtained by welding together metal sheets of great thickness so as to form a rectangular parallelepiped which is coaxially doubled by the outer casing 5b in the shape of a right prism with an irregular octagonal base also constituted by thick metal sheets. The prismatic casing 5b is provided at its top, as seen clearly in FIG. 1, with the aforesaid lateral extensions 5c protruding from each side so as to embrace and support the lower portion of the generators 2.

The vessel 1 and the generators 2 rest upon the lower structure 5 through the medium of a first set of protruding elements 8 and 11, respectively, having the general shape of journals, rods, studs or the like.

According to one example of embodiment, the protruding elements 8 are welded laterally on the vessel in such a manner that their common axis 22 is perpendicular to the common axis 23 of the protruding elements 11 welded laterally on the lower portion of the generators 2. As appears from FIG. 3, the protruding elements or studs 8 are engaged with a sliding fit in the ball-joint bearings 9 placed in or supported by the two casings 5a and 5b, whereas the protruding element 11 of each generator 2 is also engaged with a sliding fit in a ball-joint bearing 24 provided in the lateral extension 5c of the lower structure 5.

The ball-joint bearing 9 is mounted in suitable structure which itself is connected to the coaxial casings 5a and 5c as best seen in FIG. 3.

According to an essential characterizing feature of the invention, the protruding elements 8 and 11 welded to the vessel 1 and the generators 2, respectively, have a cross-section of polygonal shape which fits the corresponding polygonal shape of the bore of the ball-joint bearing so as to maintain strictly fixed the longitudinal plane passing through the axes 20 and 21, in case of transverse and even longitudinal impacts, while at the same time permitting the expansions of the assembly supported through the sliding bearing surfaces of the protruding elements.

As seen in FIGS. 1 to 3, the elements 8 and 11 may be of square cross-section, as also the bore of the bearing receiving the said elements, so that one of the diagonals of the square is directed vertically and the other horizontally. There is thus obtained a V-shaped bearing surface as mentioned at the beginning of the present description, the said bearing surface maintaining in a strictly fixed manner the vessel-generator assembly within the supporting structure.

Figure 6:
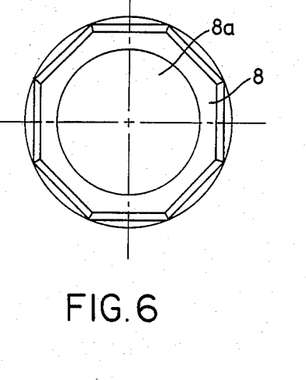
FIG. 6 is a cross-sectional view illustrating another form of embodiment of a protruding element.

According to another form of embodiment, the protruding elements 8 and 11 may have a cross-section in the shape of a regular octagon, as shown in FIG. 6, it being understood that, in this case, there are provided bearings 9 and 24 with a corresponding octagonal bore. It is understood that such an octagonal shape also ensures a fixed position of the vessel and its associated generators within the supporting structure according to the invention.

Figure 5:
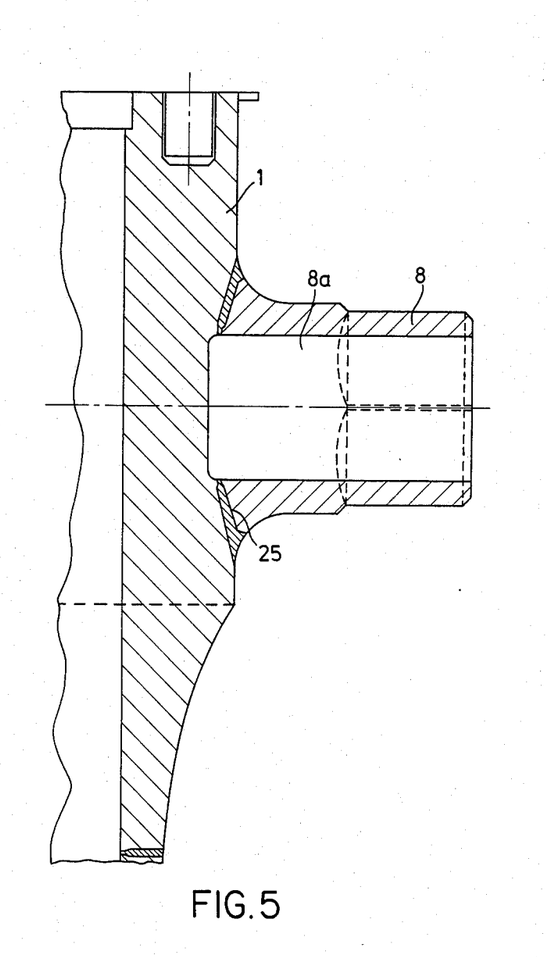
FIG. 5 is an enlarged axial sectional view of one of the protruding elements welded to the vessel.

It will be noted here that the protruding elements 8 welded on the vessel 1 may advantageously be provided with an internal bore 8a, as seen in FIG. 5, allowing an easier control of the welding of the connection 25 on the vessel and also the passage of safety injection pipings (not shown) extending along the axis of the said bore. If desired, a clearance may be provided between the end of each projecting element 8 and a safety stop 10 seen in FIG. 3. This stop allows the displacement of the vessel along the axis of the elements 8 to be prevented in case of rupture of the connections 3 between the vessel and the generators.

In the lower portion of each generator 2 are provided two diametrically opposite stop devices affording complete freedom of expansion. One of them (12) located on the same side as the protruding element 11 is fixed and retains the steam generator longitudinally in the case of snap, clear-cut or like rupture of the connection 3; the other (13) located nearer to the vessel 1 retains the generator transversely in the same case of rupture.

The upper structure 6 which, in a way, caps the lower structure 5 is constituted by an assembly of metal sheets of great thickness so as to provide in its central portion 14 (FIG. 2) the walls of the discharge pond 15 of the reactor vessel 1, as well as two right prisms 16 with a trapezoidal base forming a casing around the two steam generators, the larger base of the trapeze constituting in the lower portion of each prism one of the walls of the said discharge pond.

At 17 in FIG. 1 are shown caissons or the like serving at stiffening means and connecting the two prisms 16 at their upper portion.

As seen clearly in FIG. 1, each steam generator 2 possesses at its upper end or top a protruding element 18 of a second set of protruding elements that is welded on the generator and is of the same type as the elements 8 and 11 described previously. The elements 18 which, preferably, are of square cross-section are engaged with a sliding fit in a ball-joint bearing with a rectangular bore which is accommodated in the upper portion of the upper structure 6 and is located on the axis 21 of the generator 2. Like the bearing elements or studs 8 and 11, the elements 18 partake in the retention of the vessel and the generators, and more particularly of the latter in the transverse direction in case of impact or rupture of the connection 3 between the vessel 1 and the generators 2.

Thus, the upper structure 6 and lower structure 5 as a whole provide a supporting device of high rigidity and very high strength enclosing the primary circuit of a nuclear boiler, ensuring efficient biological protection and a fixed and accurate positioning of the components in all planes. In addition, the vessel-generators assembly, although perfectly maintained within the metallic structure, is not in any circumstances subjected to excessive stresses, owing to the flexibility of the vessel-generators connection which is much greater than that of the supporting structure.

Moreover, the design of this structure, as can be understood in light of the drawings, provides the best possibilities of access and dismounting for inspecting the apparatuses and all the mechanical members such as for example the ball-joint bearings in which the elements or studs 8, 11 and 18 associated with the vessel 1 and the generators 2 are fitted.

There is therefore provided, according to the invention, a supporting structure that maintains in a strictly fixed manner the axis of a reactor vessel and of its associated generators, thus advantageously obviating any risk of rupture between these elements should they be subjected for example to impacts in a longitudinal direction or a transverse direction, while at the same time permitting the possible expansions of the supported assembly.

Of course the invention is by no means limited to the form of embodiment described and illustrated which has been given by way of example only.

Thus, the reactor may be equipped with a different number of steam generators and the reactor vessel may be provided with more than two bearing studs on the lower structure. Likewise, the bearing studs may be of a polygonal shape other than square or octagonal, without departing from the scope of the invention.

Therefore, the invention comprises all technical means equivalent to the means described as well as their combinations, should the latter be carried out according to its spirit and used within the scope of the following claims.

What is claimed is:

1. Apparatus for supporting and protecting a compact nuclear boiler assembly having a vertical axis and constituted by a nuclear reactor vessel having the same vertical axis as that of said assembly and at least two steam generators symmetrically located around said reactor vessel, each steam generator being connected to the reactor vessel by a short pipe connection which attaches said steam generator to the reactor vessel and permits the interchange of primary coolant between the steam generator and the reactor vessel, said supporting apparatus including a metallic structure at least partially surrounding the nuclear boiler assembly and supporting the same through the medium of bearing members and comprising:

first and second sets of protruding elements cooperating with ball-joint bearings provided in said structure, at least some of said protruding elements of said first set being fixed to said reactor vessel and the other of said protruding elements of said first set being fixed to respective ones of said steam generators, said protruding elements of said first set being substantially located in a common horizontal plane and having axes which substantially intersect said axis of said reactor vessel and wherein each of the protruding elements of said second set is fixed to a respective steam generator at a distance from said horizontal plane to extend along a substantially vertical direction; and wherein said metallic structure comprises, a rigid lower structure in which ball-joint bearings are provided, said protruding elements of said first set being mounted with a sliding fit in said ball-joint bearings so that the lower structure supports and maintains the boiler assembly through the medium of said protruding elements, said protruding elements being polygonal in cross-section and said ball-joint bearings having a corresponding polygonal bore, each bore comprising two plane bearing surfaces symmetrical in relation to a vertical plane, and an upper structure forming a cover, rigidly fastened to the lower structure, said upper structure having an outer portion forming walls which enclose the steam generators to ensure mechanical and radiological shielding of said steam generators, said upper structure holding each steam generator at its upper end by a protruding element of the second set.

2. Apparatus according to claim 1 wherein said upper structure has a central portion which forms the walls of a vessel discharging pond.

3. Apparatus according to claim 1, characterized in that said lower structure is constituted by two coaxial casings surrounding the reactor vessel and fixed to a thick base plate, and wherein said reactor vessel is provided laterally with at least two of said protruding elements of said first set of polygonal cross-section mounted with a sliding fit in said ball-joint bearings provided in the inner casing and which have corresponding polygonal bores, whereas each said steam generator is provided laterally at its lower portion, on a side remote from the reactor vessel with a protruding element of said first set supported with a sliding fit in a ball-joint bearing with a corresponding polygonal bore provided in a lateral extension of the outer one of said casings of the said lower structure.

4. Apparatus according to claim 3 wherein said steam generators include respective water boxes and wherein said lateral extension of said outer casing at least partially surrounds said water boxes.

5. Apparatus according to claim 1 characterized in that at least the protruding elements fixed to said vessel comprise an internal bore for the passage of pipings installed along the axis of said bore.

6. Apparatus according to claim 1 characterized in that the said lower structure is provided at a lower portion of each steam generator with two diametrically opposed stop devices, one of which is fixed and located on the side of the generator where a protruding element is fixed to the lower portion of the steam generator, whereby the latter will be held longitudinally in case of a rupture of the pipe connecting the reactor vessel to the steam generator, whereas the other stop device is located on the same side of the generator proximate to the vessel so as to hold the steam generators transversely.

7. Apparatus according to claim 3 characterized in that the said coaxial casings of the lower structure supporting the reactor vessel and its associated steam generators through the medium of the said protruding elements comprise an inner casing in the shape of a polyhedron and an outer casing also in the shape of a polyhedron, the said casings defining between themselves and with the reactor vessel fluid-tight volumes filled with water to ensure neutronic protection.

8. Apparatus according to claim 1 characterized in that the said walls of the upper structure surrounding the steam generators form right prisms with a trapezoidal base having commong walls with a discharge pond of said vessel.

9. Apparatus for supporting and protecting a compact nuclear boiler assembly having a vertical axis and constituted by a nuclear reactor vessel having the same vertical axis as that of said assembly and at least two steam generators symmetrically located around said reactor vessel, each steam generator being connected to the reactor vessel by at least one short pipe connection which attaches said steam generator to the reactor vessel and permits the interchange of primary coolant between the steam generator and the reactor vessel, said supporting structure comprising:

a rigid metallic structure at least partially surrounding the nuclear boiler assembly to ensure its protection; and supporting devices, each of which comprises, a support bearing mounted in the metallic structure and a protruding support element attached to the nuclear boiler assembly and mounted with a sliding fit in said bearing in a manner such that the metallic structure supports the nuclear boiler assembly through the medium of said bearings and protruding support elements;

said supporting device being characterized in that said support bearings and said protruding support elements each comprise two plane bearing surfaces symmetrical in relation to a vertical plane and diverging upwardly, said bearing surfaces being the upper surfaces of the bearings and the lower surfaces of the protruding support elements, the vertical planes of symmetry of said support elements containing the axis of said assembly;

the support bearings being ball-joint bearings, one of said protruding support elements being attached to each of said steam generators on a side thereof remote from the reactor vessel, at least two of the said protruding support elements being attached to the reactor vessel symmetrically with respect to said vertical axis, and said protruding support elements attached to the steam generators and reactor vessel being located in substantially the same horizontal plane.

10. Apparatus according to claim 9 wherein said support structure comprises a rigid lower structure surrounding the reactor vessel and carrying said support bearings, the lower structure having a thick metal base plate, said apparatus being further characterized in that the lower structure comprises two metal casings fixed to said base-plate, namely an internal casing surrounding the reactor vessel and an external casing surrounding said internal casing, the two casings being attached at the top by an intermediate metal plate.

11. Apparatus according to claim 10 characterized in that said casings define at least between themselves fluid-tight volumes filled with water to ensure neutronic protection.

12. Apparatus according to claim 9 in which said steam generators have an overall shape of vertical columns, the lower part of which is located at the level of an upper portion of the reactor vessel, whereas the upper portion of each of said steam generators is located at a higher level than the reactor vessel, said apparatus being further characterized in that said support structure comprises a rigid lower structure surrounding the reactor vessel and carrying said support bearings and an upper structure fastened to the lower structure, the side sections of said upper structure having side sections surrounding said steam generators, a central section of said upper structure forming the walls of a pond used for removing fuel elements from the nuclear reactor, the top parts of said side sections being connected by box-shaped braces.

13. Apparatus according to claim 9 characterized in that it includes two stop devices provided at a lower portion of each steam generator, said stop devices being located in one vertical longitudinal plane containing the axis of the nuclear boiler assembly and the axis of the steam generator, one of said stop devices being situated remote from the nuclear boiler axis, which limits the horizontal displacement of said steam generator in said longitudinal plane relative to said lower support structure, and the other of said stop devices being situated closer to the nuclear boiler axis, to limit the horizontal displacement of the steam generator across said longitudinal plane relative to said lower support structure.

14. Apparatus according to claim 9 characterized in that said protruding support elements fixed to the reactor vessel comprise an internal bore for the passage of pipings.

* * * * *

UNITED STATES PATENT AND TRADEMARK OFFICE
CERTIFICATE OF CORRECTION

PATENT NO. : 4,511,532
DATED : April 16, 1985
INVENTOR(S) : Robert Pierart

It is certified that error appears in the above-identified patent and that said Letters Patent is hereby corrected as shown below:

The term of this patent subsequent to August 16, 2000 has been disclaimed.

Signed and Sealed this

Sixth Day of August 1985

[SEAL]

*Attest:*

*Attesting Officer*

DONALD J. QUIGG

*Acting Commissioner of Patents and Trademarks*